(12) United States Patent
Nair et al.

(10) Patent No.: US 10,878,420 B2
(45) Date of Patent: Dec. 29, 2020

(54) SYSTEM, METHOD, AND COMPUTER PROGRAM PRODUCT FOR AUTHORIZING A TRANSACTION

(71) Applicant: Visa International Service Association, San Francisco, CA (US)

(72) Inventors: Bibin Balakrishnan Nair, Singapore (SG); Ajit Kumar Sahu, Singapore (SG); Ajay Mohan, Singapore (SG); Debabrata Samantaray, Singapore (SG)

(73) Assignee: Visa International Service Association, San Francisco, CA (US)

( * ) Notice: Subject to any disclaimer, the term of this patent is extended or adjusted under 35 U.S.C. 154(b) by 379 days.

(21) Appl. No.: 15/678,514

(22) Filed: Aug. 16, 2017

(65) Prior Publication Data
US 2019/0057385 A1    Feb. 21, 2019

(51) Int. Cl.
| | |
|---|---|
| *G06Q 20/40* | (2012.01) |
| *G06Q 20/32* | (2012.01) |
| *G06Q 20/36* | (2012.01) |
| *G06F 21/31* | (2013.01) |
| *G06Q 20/38* | (2012.01) |
| *G06Q 20/12* | (2012.01) |
| *G06Q 20/22* | (2012.01) |

(52) U.S. Cl.
CPC ......... *G06Q 20/4014* (2013.01); *G06F 21/31* (2013.01); *G06Q 20/12* (2013.01); *G06Q 20/2295* (2020.05); *G06Q 20/32* (2013.01); *G06Q 20/3223* (2013.01); *G06Q 20/3674* (2013.01); *G06Q 20/3821* (2013.01); *G06Q 20/401* (2013.01); *G06Q 20/4012* (2013.01); *G06Q 20/4093* (2013.01); *G06F 2221/2101* (2013.01); *G06F 2221/2141* (2013.01)

(58) Field of Classification Search
CPC ........................... G06Q 20/4014; G06Q 20/32
USPC .......................................................... 705/44
See application file for complete search history.

(56) References Cited

U.S. PATENT DOCUMENTS

| | | | |
|---|---|---|---|
| 9,043,224 B2 | 5/2015 | Simmons | |
| 2014/0006280 A1* | 1/2014 | Scipioni | G06Q 20/42 705/44 |
| 2015/0304323 A1* | 10/2015 | Alsina | G06Q 20/12 705/44 |

(Continued)

*Primary Examiner* — Hai Tran
(74) *Attorney, Agent, or Firm* — The Webb Law Firm

(57) ABSTRACT

Provided is a computer-implemented method for remotely authorizing a transaction. The method includes receiving a transaction request including at least one user identifier, determining an authorizing user of a plurality of authorizing users based at least partially on the at least one user identifier, determining whether the authorizing user is online, communicating, to a user device associated with the at least one authorizing user, an authorization request message, wherein, if the authorizing user is online, the authorization request message includes a mobile device message configured to prompt the authorizing user to provide an approval of the transaction request, and wherein, if the authorizing user is offline, the authorization request message includes an automated telephone call configured to audibly prompt the authorizing user to provide an approval of the transaction request, and completing the transaction in response to receiving an approval of the transaction request from the authorizing user.

10 Claims, 4 Drawing Sheets

(56) References Cited

U.S. PATENT DOCUMENTS

2016/0239842 A1 8/2016 Cash et al.

* cited by examiner

SYSTEM, METHOD, AND COMPUTER PROGRAM PRODUCT FOR AUTHORIZING A TRANSACTION

BACKGROUND OF THE INVENTION

1. Field of the Invention

This invention relates generally to remote authorization and, in non-limiting embodiments, to a system, method, and computer program product for remotely authorizing a transaction.

2. Technical Considerations

To conduct a transaction, such as a payment with a merchant, account holders must use typically present a portable device, such as a physical payment card or mobile device equipped with an electronic wallet. Merchants often check the identity of the purported account holder to protect against fraudulent transactions. For Internet-based transactions, such as those conducted through online retailer e-commerce websites, it is more difficult to determine whether the user requesting the transaction is the account holder or is authorized by the account holder. To address this, online retailers and transaction service providers may request proof of identify, such as a security code printed on a physical payment card or other credentials.

Some users may share their account information with certain authorized users to make purchases. Those authorized users may be permitted to make certain purchases, but not others. For example, an authorized user may be permitted by the account holder to purchase grocery items but not entertainment items, or to conduct purchases below a certain predetermined threshold amount. However, account holders must typically trust the authorized users to only conduct permissible transactions. Further, providing account data to others presents many security risks.

Moreover, users may present portable devices to be granted access to a system or facility. As in payment transactions, a user that has the privilege of access to a system or facility may be hesitant to provide that privilege to others without some ability to monitor and/or authorize the use of that portable device.

Accordingly, there is a need for a technically improved system and method for remotely authorizing a transaction that overcomes at least some of these problems.

SUMMARY OF THE INVENTION

Accordingly, it is an object of the present invention to provide a system, method, and computer program product for authenticating a transaction that overcomes some or all of the deficiencies of the prior art.

According to a non-limiting embodiment, provided is a computer-implemented method for remotely authorizing a transaction, comprising: receiving, through a graphical user interface, a transaction request comprising at least one user identifier; determining, with at least one processor, an authorizing user of a plurality of authorizing users based at least partially on the at least one user identifier; determining, with at least one processor, whether the authorizing user is online; communicating, to a user device associated with the at least one authorizing user, an authorization request message, wherein, if the authorizing user is online, the authorization request message comprises a mobile device message configured to prompt the authorizing user to provide an approval of the transaction request, and wherein, if the authorizing user is offline, the authorization request message comprises an automated telephone call configured to audibly prompt the authorizing user to provide an approval of the transaction request; and completing the transaction in response to receiving an approval of the transaction request from the authorizing user.

In non-limiting embodiments, the transaction request is received from a requesting user, and the method further comprises: determining, with at least one processor, whether the requesting user is approved to conduct the transaction based on at least one approval database and the at least one user identifier; and automatically generating, with at least one processor, the approval of the transaction in response to determining that the requesting user is approved to conduct the transaction. In some non-limiting embodiments, the at least one user identifier comprises a telephone number, and the at least one approval database comprises a plurality of telephone numbers associated with the authorizing user.

In non-limiting embodiments, the transaction comprises at least one of the following: a payment transaction, granting access to a system, granting access to a facility, or any combination thereof. In non-limiting embodiments, determining whether the authorizing user is online comprises: communicating the mobile device message configured to prompt the authenticating user to provide an approval of the transaction request; and determining that the authorizing user is not online in response to determining that the approval of the transaction request is not received within a predefined time period. In some non-limiting embodiments, determining the authorizing user and determining whether the authorizing user is online is performed with the same at least one processor.

In non-limiting embodiments, provided is a computer program product for authorizing a transaction, comprising at least one non-transitory computer readable medium including program instructions that, when executed by at least one processor, cause the at least one processor to: receive, through a graphical user interface, a transaction request comprising at least one user identifier; determine an authorizing user of a plurality of authorizing users based at least partially on the at least one user identifier; determine whether the authorizing user is online; in response to determining that the authorizing user is not online, communicating an authorization request message to a user device associated with the at least one authorizing user, the authorization request message comprising an automated telephone call configured to audibly prompt the authorizing user to provide an approval of the transaction request; and complete the transaction in response to receiving an approval of the transaction request from the authorizing user.

In non-limiting embodiments, determining whether the authorizing user is online comprises: communicating a mobile device message configured to prompt the authenticating user to provide an approval of the transaction request; and determining that the authorizing user is not online in response to determining that the approval of the transaction request is not received within a predefined time period. In non-limiting embodiments, the transaction request is received from a requesting user, and the program instructions, when executed by the at least one processor, further cause the at least one processor to: determine whether the requesting user is approved to conduct the transaction based on at least one approval database and the at least one user identifier; and in response to determining that the requesting user is approved to conduct the transaction, automatically generate the approval of the transaction request.

In non-limiting embodiments, the at least one user identifier comprises a telephone number, and the at least one approval database comprises a plurality of telephone numbers associated with the authorizing user. In some non-limiting embodiments, the transaction comprises at least one of the following: a payment transaction, granting access to a system, granting access to a facility, or any combination thereof. In non-limiting embodiments, the program instructions, when executed by the at least one processor, further cause the at least one processor to: in response to determining that the authorizing user is not online, communicate a different authorization request message to a user device associated with the at least one authorizing user, the different authorization request message comprising a mobile device message configured to cause the user device associated with the at least one authorizing user to prompt the authorizing user to provide an approval of the transaction request.

According to another non-limiting embodiment, a computer program product for authorizing a transaction, comprising at least one non-transitory computer readable medium including program instructions that, when executed by at least one processor, cause the at least one processor to: receive, through a graphical user interface, a transaction request comprising at least one user identifier, the at least one user identifier uniquely identifying a requesting user of a plurality of requesting users; determine an authorizing user of a plurality of authorizing users based at least partially on the at least one user identifier; determine whether the requesting user is approved to conduct the transaction based on at least one approval database and the at least one user identifier; complete the transaction in response to determining that the requesting user is approved to conduct the transaction; and in response to determining that the requesting user is not approved to conduct the transaction, communicate, to a user device associated with at least one authorizing user, a first authorization request message.

In non-limiting embodiments, the program instructions, when executed by the at least one processor, further cause the at least one processor to: complete the transaction in response to receiving an authorization response message comprising an approval of the transaction from the user device associated with the authorizing user. In non-limiting embodiments, the program instructions, when executed by the at least one processor, further cause the at least one processor to: determine whether the authorizing user is online; and in response to determining that the authorizing user is not online, communicate, to the user device associated with the authorizing user or a second user device associated with the authorizing user, a second authorization request message.

In non-limiting embodiments, the first authorization request message comprises a mobile device message configured to cause the user device associated with the authorizing user to prompt the authorizing user to provide an approval of the transaction request, and the second authorization request message comprises an automated telephone call configured to audibly prompt the authorizing user to provide an approval of the transaction request.

According to a further non-limiting embodiment, provided is a system for authorizing a transaction, comprising at least one server computer including at least one processor programmed or configured to: receive, through a graphical user interface, a transaction request comprising at least one user identifier; determine an authorizing user of a plurality of authorizing users based at least partially on the at least one user identifier; determine whether the authorizing user is online; in response to determining that the authorizing user is not online, communicating an authorization request message to a user device associated with the at least one authorizing user, the authorization request message comprising an automated telephone call configured to audibly prompt the authorizing user to provide an approval of the transaction request; and complete the transaction in response to receiving an approval of the transaction request from the authorizing user.

In non-limiting embodiments, determining whether the authorizing user is online comprises: communicating a mobile device message configured to prompt the authenticating user to provide an approval of the transaction request; and determining that the authorizing user is not online in response to determining that the approval of the transaction request is not received within a predefined time period. In non-limiting embodiments, the transaction request is received from a requesting user, and the at least one processor is further programmed or configured to: determine whether the requesting user is approved to conduct the transaction based on at least one approval database and the at least one user identifier; and in response to determining that the requesting user is approved to conduct the transaction, automatically generate the approval of the transaction request. In non-limiting embodiments, the at least one user identifier comprises a telephone number, and the at least one approval database comprises a plurality of telephone numbers associated with the authorizing user.

In non-limiting embodiments, the transaction comprises at least one of the following: a payment transaction, granting access to a system, granting access to a facility, or any combination thereof. In non-limiting embodiments, the at least one processor is further programmed or configured to: in response to determining that the authorizing user is not online, communicate a different authorization request message to a user device associated with the at least one authorizing user, the different authorization request message comprising a mobile device message configured to cause the user device associated with the at least one authorizing user to prompt the authorizing user to provide an approval of the transaction request.

Further preferred and non-limiting embodiments or aspects are set forth in the following numbered clauses.

Clause 1: A computer-implemented method for remotely authorizing a transaction, comprising: receiving, through a graphical user interface, a transaction request comprising at least one user identifier; determining, with at least one processor, an authorizing user of a plurality of authorizing users based at least partially on the at least one user identifier; determining, with at least one processor, whether the authorizing user is online; communicating, to a user device associated with the at least one authorizing user, an authorization request message, wherein, if the authorizing user is online, the authorization request message comprises a mobile device message configured to prompt the authorizing user to provide an approval of the transaction request, and wherein, if the authorizing user is offline, the authorization request message comprises an automated telephone call configured to audibly prompt the authorizing user to provide an approval of the transaction request; and completing the transaction in response to receiving an approval of the transaction request from the authorizing user.

Clause 2: The computer-implemented method of clause 1, wherein the transaction request is received from a requesting user, further comprising: determining, with at least one processor, whether the requesting user is approved to conduct the transaction based on at least one approval database and the at least one user identifier; and automatically generating, with at least one processor, the approval of the transaction in response to determining that the requesting user is approved to conduct the transaction.

Clause 3: The computer-implemented method of any of clauses 1-2, wherein the at least one user identifier comprises a telephone number, and wherein the at least one approval database comprises a plurality of telephone numbers associated with the authorizing user.

Clause 4: The computer-implemented method of any of clauses 1-3, wherein the transaction comprises at least one of the following: a payment transaction, granting access to a system, granting access to a facility, or any combination thereof.

Clause 5: The computer-implemented method of any of clauses 1-4, wherein determining whether the authorizing user is online comprises: communicating the mobile device message configured to prompt the authenticating user to provide an approval of the transaction request; and determining that the authorizing user is not online in response to determining that the approval of the transaction request is not received within a predefined time period.

Clause 6: The computer-implemented method of any of clauses 1-5, wherein determining the authorizing user and determining whether the authorizing user is online is performed with the same at least one processor.

Clause 7: A computer program product for authorizing a transaction, comprising at least one non-transitory computer readable medium including program instructions that, when executed by at least one processor, cause the at least one processor to: receive, through a graphical user interface, a transaction request comprising at least one user identifier; determine an authorizing user of a plurality of authorizing users based at least partially on the at least one user identifier; determine whether the authorizing user is online; in response to determining that the authorizing user is not online, communicating an authorization request message to a user device associated with the at least one authorizing user, the authorization request message comprising an automated telephone call configured to audibly prompt the authorizing user to provide an approval of the transaction request; and complete the transaction in response to receiving an approval of the transaction request from the authorizing user.

Clause 8: The computer program product of clause 7, wherein determining whether the authorizing user is online comprises: communicating a mobile device message configured to prompt the authenticating user to provide an approval of the transaction request; and determining that the authorizing user is not online in response to determining that the approval of the transaction request is not received within a predefined time period.

Clause 9: The computer program product of any of clauses 7-8, wherein the transaction request is received from a requesting user, and wherein the program instructions, when executed by the at least one processor, further cause the at least one processor to: determine whether the requesting user is approved to conduct the transaction based on at least one approval database and the at least one user identifier; and in response to determining that the requesting user is approved to conduct the transaction, automatically generate the approval of the transaction request.

Clause 10: The computer program product of any of clauses 7-9, wherein the at least one user identifier comprises a telephone number, and wherein the at least one approval database comprises a plurality of telephone numbers associated with the authorizing user.

Clause 11: The computer program product of any of clauses 7-10, wherein the transaction comprises at least one of the following: a payment transaction, granting access to a system, granting access to a facility, or any combination thereof.

Clause 12: The computer program product of any of clauses 7-11, wherein the program instructions, when executed by the at least one processor, further cause the at least one processor to: in response to determining that the authorizing user is not online, communicate a different authorization request message to a user device associated with the at least one authorizing user, the different authorization request message comprising a mobile device message configured to cause the user device associated with the at least one authorizing user to prompt the authorizing user to provide an approval of the transaction request.

Clause 13: A computer program product for authorizing a transaction, comprising at least one non-transitory computer readable medium including program instructions that, when executed by at least one processor, cause the at least one processor to: receive, through a graphical user interface, a transaction request comprising at least one user identifier, the at least one user identifier uniquely identifying a requesting user of a plurality of requesting users; determine an authorizing user of a plurality of authorizing users based at least partially on the at least one user identifier; determine whether the requesting user is approved to conduct the transaction based on at least one approval database and the at least one user identifier; complete the transaction in response to determining that the requesting user is approved to conduct the transaction; and in response to determining that the requesting user is not approved to conduct the transaction, communicate, to a user device associated with at least one authorizing user, a first authorization request message.

Clause 14: The computer program product of clause 13, wherein the program instructions, when executed by the at least one processor, further cause the at least one processor to: complete the transaction in response to receiving an authorization response message comprising an approval of the transaction from the user device associated with the authorizing user.

Clause 15: The computer program product of any of clauses 13-14, wherein the program instructions, when executed by the at least one processor, further cause the at least one processor to: determine whether the authorizing user is online; and in response to determining that the authorizing user is not online, communicate, to the user device associated with the authorizing user or a second user device associated with the authorizing user, a second authorization request message.

Clause 16: The computer program product of any of clauses 13-15, wherein the first authorization request message comprises a mobile device message configured to cause the user device associated with the authorizing user to prompt the authorizing user to provide an approval of the transaction request, and wherein the second authorization request message comprises an automated telephone call configured to audibly prompt the authorizing user to provide an approval of the transaction request.

Clause 17: A system for authorizing a transaction, comprising at least one server computer including at least one processor programmed or configured to: receive, through a graphical user interface, a transaction request comprising at least one user identifier; determine an authorizing user of a plurality of authorizing users based at least partially on the at least one user identifier; determine whether the authorizing user is online; in response to determining that the authorizing user is not online, communicating an authorization request message to a user device associated with the at least one authorizing user, the authorization request message comprising an automated telephone call configured to audibly prompt the authorizing user to provide an approval of the transaction request; and complete the transaction in response to receiving an approval of the transaction request from the authorizing user.

Clause 18: The system of clause 17, wherein determining whether the authorizing user is online comprises: communicating a mobile device message configured to prompt the authenticating user to provide an approval of the transaction request; and determining that the authorizing user is not online in response to determining that the approval of the transaction request is not received within a predefined time period.

Clause 19: The system of any of clauses 17-18, wherein the transaction request is received from a requesting user, and wherein the at least one processor is further programmed or configured to: determine whether the requesting user is approved to conduct the transaction based on at least one approval database and the at least one user identifier; and in response to determining that the requesting user is approved to conduct the transaction, automatically generate the approval of the transaction request.

Clause 20: The system of any of clauses 17-19, wherein the at least one user identifier comprises a telephone number, and wherein the at least one approval database comprises a plurality of telephone numbers associated with the authorizing user.

Clause 21: The system of any of clauses 17-20, wherein the transaction comprises at least one of the following: a payment transaction, granting access to a system, granting access to a facility, or any combination thereof.

Clause 22: The system of any of clauses 17-21, wherein the at least one processor is further programmed or configured to: in response to determining that the authorizing user is not online, communicate a different authorization request message to a user device associated with the at least one authorizing user, the different authorization request message comprising a mobile device message configured to cause the user device associated with the at least one authorizing user to prompt the authorizing user to provide an approval of the transaction request.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
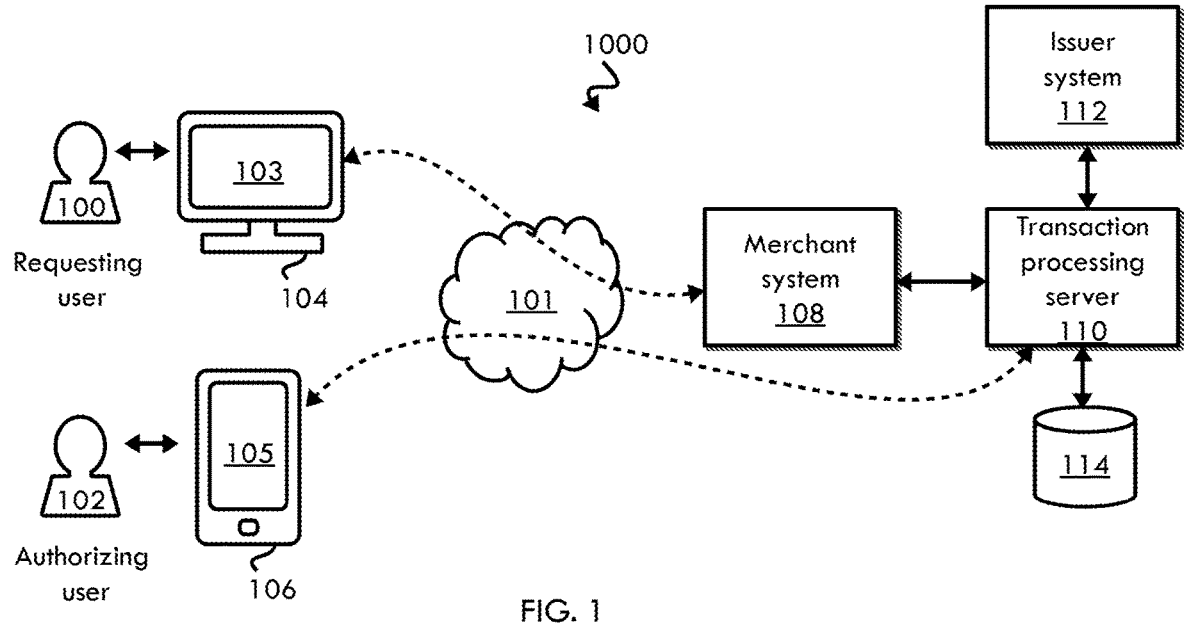
FIG. 1 is a schematic diagram of a system for remotely authorizing a transaction according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

Non-limiting embodiments of the present invention are directed to a system, method, and computer program product for remotely authorizing a transaction that allows for improved security and convenience for users. In non-limiting embodiments, account holders can remotely and selectively authorize transactions initiated by other users, such as payment transactions and/or transactions for being granted access to a system or facility. Non-limiting embodiments solve the problems that arise when an authorization request is communicated to an account holder or other authorizing user and is not immediately seen or acted upon. By determining whether the authorizing user is online or offline, an authorization request message can be communicated in a manner that is most likely to be acted upon. For example, if it is determined that the authorizing user is online, an authorization request message can be communicated to a mobile application on the authorizing user's device and, if it is determined that the authorizing user is offline, non-limiting embodiments of the system communicate an authorization request message to a telephone associated with the authorizing user and/or the authorizing user's device.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies it among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application and may further include server-side software and/or databases for maintaining and providing transaction data to the mobile device. An "electronic wallet provider" may include an entity that provides and/or maintains an electronic wallet for a customer, such as Google Wallet™, Android Pay™ Apple Pay®, Samsung Pay®, and/or other like electronic payment systems. In some non-limiting examples, an issuer bank may be an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include a volatile or a non-volatile memory to store information, such as an account identifier or a name of the account holder.

Referring now to FIG. 1, a system 1000 for remotely authorizing a user is shown according to a non-limiting embodiment. A requesting user 100 operates a requesting user device 104 to initiate a transaction. The requesting user device 104 may be any type of computing device, such as a laptop computer, desktop computer, mobile device, kiosk, and/or the like. The requesting user device 104 may display one or more graphical user interfaces (GUIs) 103, such as a merchant website, including selectable options. The requesting user device 104 is in communication with a merchant system 108 via a network environment 101, such as the Internet or a private network. In non-limiting embodiments, the merchant system 108 may include, for example, a merchant e-commerce server that provides a webpage that is viewed and interacted with by the requesting user 100 through a GUI 103 on the requesting user device 104. The merchant system 108 is in communication with a transaction processing server 110. In other non-limiting embodiments, the requesting user device 104 may communicate with the transaction processing server 110 directly or via a payment gateway and/or acquirer system.

With continued reference to FIG. 1, an authorizing user 102 operates an authorizing user device 106, such as a mobile device or any other computing device. The authorizing user device 106 may display one or more GUIs 105. The authorizing user device 106 is in communication with the transaction processing server 110 via the network environment 101. It will be appreciated that the authorizing user device 106 may additionally or alternatively be in communication with the merchant system 108 and/or issuer system 112. The transaction processing server 110 may be in communication with one or more issuer systems 112 associated with one or more issuer institutions and one or more acquirer systems (not shown) associated with one or more acquirer institutions to settle a transaction. The transaction processing server 110 is also in communication with an account database 114 including account data associated with one or more users. It will be appreciated that various other arrangements are possible. For example, an electronic wallet provider (not shown in FIG. 1) may facilitate a transaction between the requesting user device 104 and transaction processing server 110.

In operation, and still referring to FIG. 1, the requesting user 100 may request a transaction through the GUI 103 displayed on the requesting user device 104. The request may include at least one user identifier associated with the requesting user 100 and transaction data associated with the requested transaction. The at least one user identifier may be unique to the requesting user 100 or the authorizing user 102. A user identifier may include, for example, one or more telephone numbers, network addresses, device identifiers, user credentials (user name, password, PIN, etc.), account identifiers, and/or other like information to identify a user or a device associated with a user. In response to the requesting user's 100 request, the requesting user device 104, the merchant system 108, a payment gateway, an electronic wallet system, and/or an acquirer system may generate a transaction request message that includes the transaction data and the user identifier. The transaction message may be communicated to the transaction processing server 110.

Still referring to FIG. 1, in response to receiving the transaction request message, the transaction processing server 110 or some other computing device may query the account database 114 based on the user identifier. For example, if the user identifier is a telephone number associated with the requesting user, the transaction processing server 110 may query the account database 114 for records including or associated with that telephone number. The query returns one or more account identifiers associated with an account holder, which may be the authorizing user 102. The query may also return an indication that authorization is needed from the authorizing user 102 to complete the transaction requested by the requesting user 100. In such examples, the transaction processing server 110 may query the account database 114 to determine user data associated with the authorizing user 102. For example, the query may return a network address, user name, telephone number, and/or other like user data for the authorizing user 102.

With continued reference to FIG. 1, the transaction processing server 110, in response to determining user data associated with the authorizing user 102, generates and communicates an authorization request message to the authorizing user device 106. It will be appreciated, however, that an authorization request message may be generated and/or communicated by any other system or device. The authorizing user device 106, in response to receiving the authorization request message, generates a GUI 105 to prompt the authorizing user 102 to approve or reject the transaction. The GUI 105 may include transaction data associated with the transaction requested by the requesting user 100, an identity of the requesting user 100, and one or more selectable options to authorize the transaction. The prompt may be a push notification on a GUI 105, a text message, a webpage, one or more windows of a mobile application, and/or the like. Moreover, the authorizing user 102 may authorize the transaction with user input such as, but not limited to, typing credentials, choosing a selectable option, speech recognition, providing a biometric input, and/or the like. The mobile device, in response to the authorizing user approving the transaction, generates an authorization response message and communicates the authorization response message to the transaction processing server 110. In some non-limiting embodiments, the authorization response message may also be generated in response to the authorizing user rejecting the transaction, and the transaction message may in such cases indicate that the authorizing user 102 rejected the transaction.

The transaction processing server 110, in response to receiving the authorization response message, determines if the authorization response message authorizes the transaction. As an example, the authorization response message may include a field or flag that indicates approval or rejection of the transaction. The authorizing user 102 may be further prompted to authenticate himself or herself by inputting authentication data into the authorizing user device 106 such as, for example, a user name, password, PIN, biometric input, and/or the like. In response to determining that the transaction was approved by the authorizing user, the transaction processing server 110 may complete the transaction and send a confirmation message to the merchant system 108 and/or the requesting user device 104 to confirm the transaction. In response to determining that the transaction was rejected by the authorizing user, the transaction processing server 110 may send a notification message to the merchant system 108 and/or the requesting user device 104.

Figure 2:
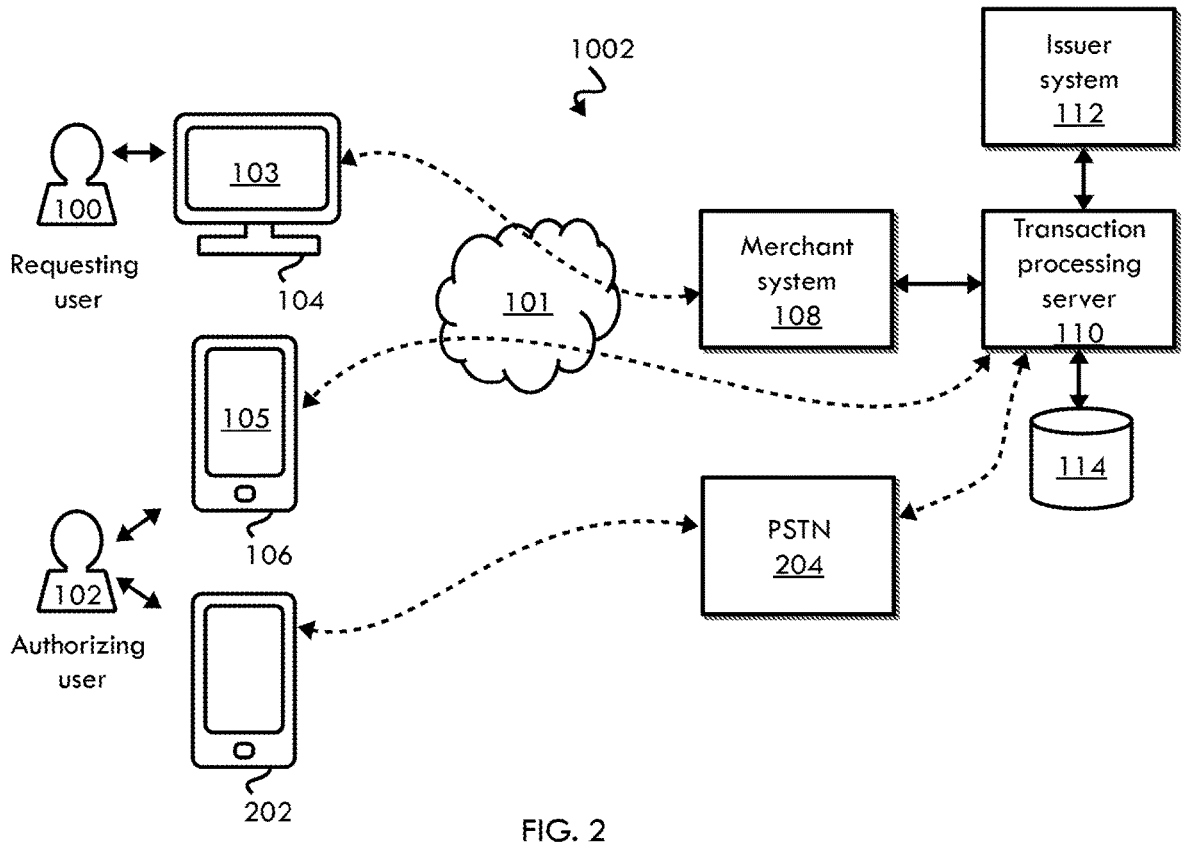
FIG. 2 is a schematic diagram of a system for remotely authorizing a transaction according to another non-limiting embodiment.

Referring now to FIG. 2, a system 1002 for remotely authorizing a user is shown according to another non-limiting embodiment. The system 1002 shown in FIG. 2 includes all of the components shown in FIG. 1 and as described above. The system 1002 also includes a second authorizing user device 202 in communication with the transaction processing server 110 via a public-switched telephone network (PSTN) 204. It will be appreciated that the second authorizing user device 202 may additionally or alternatively be in communication with the transaction processing server 110 via the network environment 101, a different network, and/or any other like communication channel. The second authorizing user device 202 may be any computing device and, in non-limiting embodiments, is a telephone such as a landline or a cellular phone.

With continued reference to FIG. 2, in response to receiving the transaction request message, the transaction processing server 110 may determine whether to communicate an authorization request message to the authorizing user device 106, the second authorizing user device 202, or some other device associated with the authorizing user 102. For example, the transaction processing server 110 may determine whether the authorizing user device 106 is online (e.g., has a network connection, such as an Internet connection) or offline by attempting to communicate the authorization request message to the authorizing user device 106. If an authorization response message is not received within a predetermined time period, or if an error is received, the transaction processing server 110 may determine that the authorizing user device 106 is offline. The transaction processing server 110 may also determine whether the authorizing user device 106 is online or offline by pinging the authorizing user device 106, analyzing recent activity of the authorizing user device 106, and/or receiving a status message. In response to determining that the authorizing user device 106 is offline, the transaction processing server 110 may communicate an authorization request message to the second authorizing user device 202 or, in other examples, to the authorizing user device 106 via the PSTN 204 or alternative communication channel. The authorization request message may be, for example, an IVR script that is by communicated by the transaction processing server 110 by initiating an automated telephone call with the second authorizing user device 202 or the authorizing user device 106.

The system 1002 shown in FIG. 2 allows for a transaction initiated by a requesting user 100 to be remotely authorized by an authorizing user 102 even though the authorizing user device 106 may be offline. For example, if the authorizing user device 106 is a cellular phone that communicates with the transaction processing server 110 via the network 101, wireless data service may be lost in certain regions and/or locations. Further, the authorizing user device 106 may be in airplane mode or wireless data services may be turned off to preserve a data allotment or battery power. In each of these scenarios, the authorizing user device 106 is unable to receive an authorization request message via the network 101 and, as a result, the authorizing user 102 is unable to authorize a potentially important transaction. To obtain authorization, the transaction processing server 110 initiates a telephone call to the authorizing user device 106 and/or the second authorizing user device 202 through the PSTN 204 or some other communication channel.

Although the system 1002 shown in FIG. 2 shows two separate authorizing user devices 106, 202, it will be appreciated that a single authorizing user device 106 may be used to prompt the authorizing user 102 in an online or offline mode. For example, in non-limiting embodiments in which the authorizing user device 106 is a cellular phone, the authorizing user device 106 may communicate with the transaction processing server 110 via the network environment 101 and a separate PSTN 204 or other network. In this manner, the authorizing user device 106 may be used when a user is online and when a user is offline. For example, if online, the authorization request message may cause the authorizing user device 106 to prompt the authorizing user 100 with a push notification and, if offline, the authorization request message may be communicated as an automated telephone call to the authorizing user device 106.

In non-limiting embodiments, and with continued reference to FIGS. 1 and 2, the authorizing user 102 may initially register one or more requesting users 100 with the transaction processing server 110 or some other computing device. As an example, the authorizing user may request, through the authorizing user device 106, that the requesting user 100 be provided with a user identifier to allow for the requesting user 100 to initiate transactions with the authorizing user's 102 account. The transaction processing server 110, in response to such a request, may generate a user identifier for the requesting user 100 and link that user identifier to the authorizing user's 102 account in the account database 114. Additionally or alternatively, the user identifier may include a preexisting identifier for the requesting user 100, such as a telephone number, email address, account user name, and/or the like, and this preexisting identifier may be linked to the authorizing user's 102 account in the account database 114.

In non-limiting embodiments, the authorizing user 102 may register a requesting user 100 based on a specific device. For example, the authorizing user 102 may register a device identifier associated with the requesting user 100 such that only the requesting user device 104 can be used to initiate transactions. It will be appreciated that various other parameters may be specified by the authorizing user 102 when registering the requesting user 100 or afterwards. Moreover, in some non-limiting embodiments, the authorizing user 102 may specify one or more alternative or additional authorizing users to authorize transactions instead of the authorizing user 102 or if the authorizing user 102 is unavailable. For example, and referring now to FIG. 2, the second authorizing user device 202 may be operated by a second authorizing user (not shown) such that, if it is determined that the authorizing user device 106 is offline, an authorization request message may be communicated to the second authorizing user device 202. Further, in some examples, if the second authorizing user device 202 is operated by the authorizing user 102, there may be a second authorizing user as a failsafe in the event that the authorizing user 102 does not respond to the authorization request message communicated to the second authorizing user device 202.

Still referring to FIGS. 1 and 2, the authorizing user 102 may register multiple requesting users in some non-limiting embodiments. Further, the authorizing user 102 may specify one or more authorization rules that can be used to determine how to process a transaction initiated by a requesting user 100. In some embodiments, the authorizing user 102 may specify an authorization rule with a threshold value such that, if the transaction value satisfies the threshold, the transaction processing server 110 can automatically reject or approve the transaction without requiring express authorization from the authorizing user 100. A threshold may be satisfied if a value is less than, equal to, or greater than the threshold value. For example, the authorizing user 102 may specify that all or some requesting users can initiate transactions less than $20 without requiring approval from the authorizing user 102. The authorizing user 102 may also specify that all or some requesting users can initiate transactions at certain types of merchants, such as grocery stores, such that approval is not required for a transaction having a Merchant Category Code (MCC) that is associated with grocery stores.

In non-limiting embodiments, the authorizing user 102 may specify different rules for different requesting users. For example, some requesting users may be able to conduct transactions without approval from the authorizing user 102, and other requesting users may be subject to stricter rules. An authorization rule may include, for example, a whitelist of requesting users that do not need permission. It will be appreciated that authorization rules may be specified based on any parameter of the transaction data such as, but not limited to, transaction value, transaction time, transaction location, MCC, and/or the like. The authorization rules may be stored in the authorization database 114 or elsewhere.

In non-limiting embodiments, and still referring to FIGS. 1 and 2, the authorizing user 102 may have an account with a transaction service provider that allows for the authorizing user to initiate transactions using credentials, such as a user name, password, PIN, biometric input, and/or the like. This may include, for example, a Visa Checkout account or any other financial account that provides tokens for use in online purchases to avoid the need and security risk of inputting a PAN or other account identifier. In such examples, the authorizing user 102 may not want to provide his or her credentials to the requesting user 100. Therefore, in non-limiting embodiments, the requesting user 100 is provided with a user identifier that is linked to the authorizing user's 102 account to enable the requesting user 100 to initiate transactions without the authorizing user's 102 credentials. In some examples, the requesting user 100 may use additional credentials for initiating a transaction such as, for example, a password, PIN, or biometric input that corresponds to the user identifier.

Although FIGS. 1 and 2 show a merchant system 108, transaction processing server 110, and issuer system 112, it will be appreciated that the systems 1000, 1002 may be utilized with non-financial transactions. For example, the authorizing user 102 may remotely and selectively approve or reject of transactions that would grant the requesting user 100 access to a system or device. As an example, the requesting user 100 may request authorization to access a computer system by entering a user identifier either through an input device or with a wireless access device, such as a transponder, that has the user identifier stored thereon. The requesting user 100 may also request authorization to access a physical building, room, or facility. In such examples, a server computer may receive a transaction request message from a computer system or electronic access system (e.g., such as a locking arrangement on a door of a building or cabinet). The server computer may generate and communicate an authorization request message to the authorizing user device 102 and/or second authorizing user device 202 as described herein. The authorization response message received may cause the server computer to generate and communicate an activation signal to provide the requesting user 100 with access to the computer system or facility.

Figure 3:
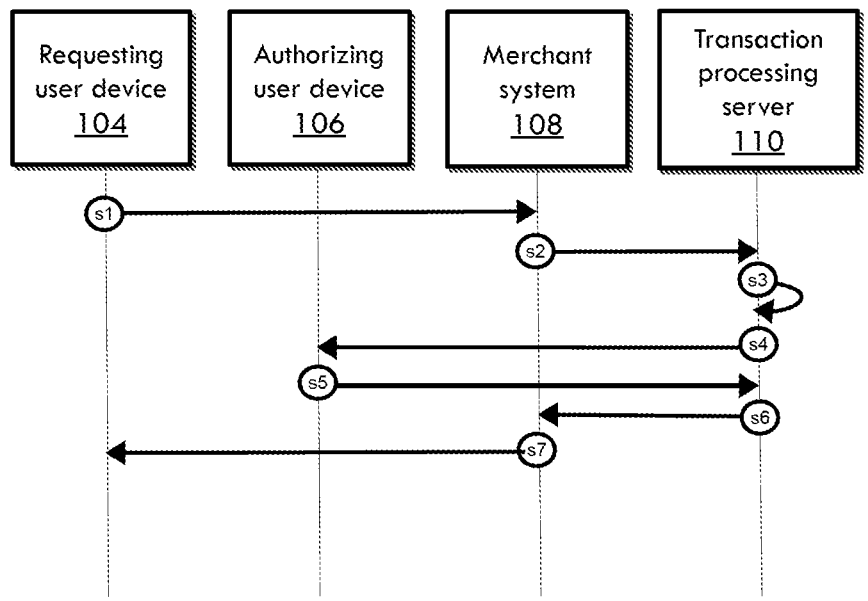
FIG. 3 is a sequence diagram of a method for remotely authorizing a transaction according to a non-limiting embodiment.

Referring now to FIG. 3, a sequence diagram is shown for a method of remotely authorizing a user according to a non-limiting embodiment. At step s1, the requesting user device 104 communicates a transaction request to the merchant system 108. This may include, for example, requesting a transaction on an e-commerce webpage by entering payment credentials into the requesting user device 104. The merchant system 108, or an acquirer system or payment gateway associated with the merchant system 108, communicates a transaction request message to the transaction processing server 110 at step s2. At step s3, the transaction processing server 110, based at least partially on the transaction request message, determines the authorizing user and/or the authorizing user device 106. The transaction processing server 110 then, at step s4, communicates an authorization request message to the authorizing user device 106. The authorization request message may prompt the authorizing user to provide user input indicating that the transaction is authorized or not authorized. At step s5, the authorizing user device 106 communicates an authorization response message to the transaction processing server 110. The transaction processing server 110, at step s6, communicates a confirmation message to the merchant system 108 indicating that the transaction is authorized or not authorized. The merchant system 108, at step s7, conveys this information to the requesting user device 104 by indicating that the transaction is approved or rejected.

Figure 4:
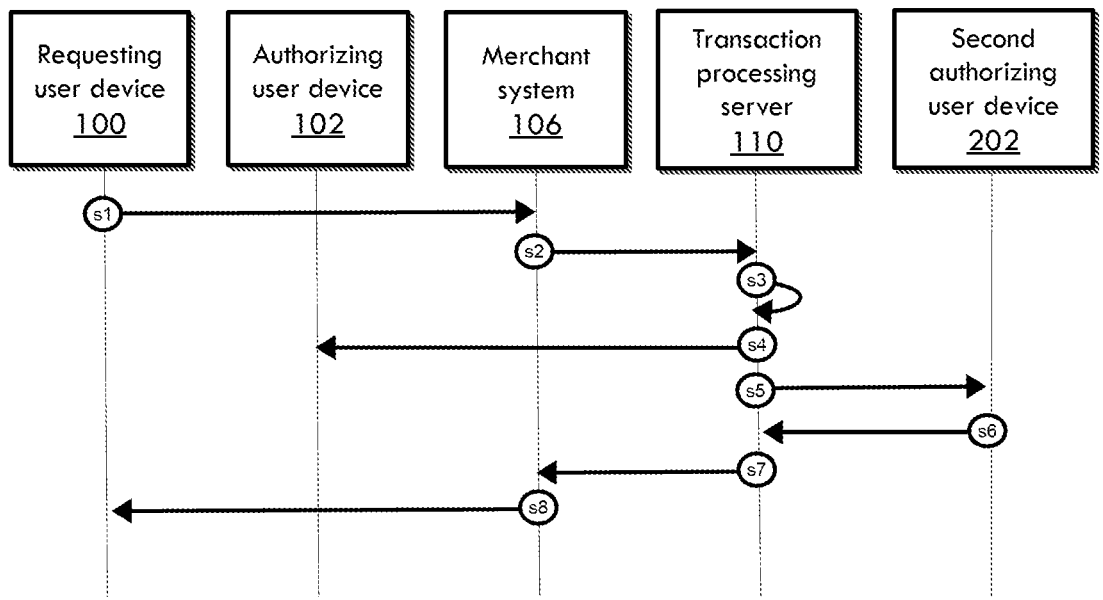
FIG. 4 is a sequence diagram of a method for remotely authorizing a transaction according to another non-limiting embodiment.

Referring now to FIG. 4, a sequence diagram is shown for a method of remotely authorizing a user according to another non-limiting embodiment. Steps s1-s4 of FIG. 4 are performed as steps s1-s4 are performed in FIG. 3 and described above. After communicating an authorization request message to the authorizing user device 106 and not receiving an authorization response message within a predetermined time period, the transaction processing server 110 may communicate an authorization response message to a second authorizing user device 202 at step s5. The second authorizing user device 202 may be a separate device operated by the authorizing user or another designated authorizing user or, in other examples, may be the same device as the authorizing user device 106 and in communication with the transaction processing server 110 via a different communication channel, such as a PSTN. At step s6 of FIG. 4, the second authorizing user device 202 communicates an authorization response message to the transaction processing server 110. The transaction processing server 110, at step s7, communicates a confirmation message to the merchant system 108 indicating that the transaction is authorized or not authorized. The merchant system 108, at step s8, conveys this information to the requesting user device 104 by indicating that the transaction is approved or rejected.

Figure 5:
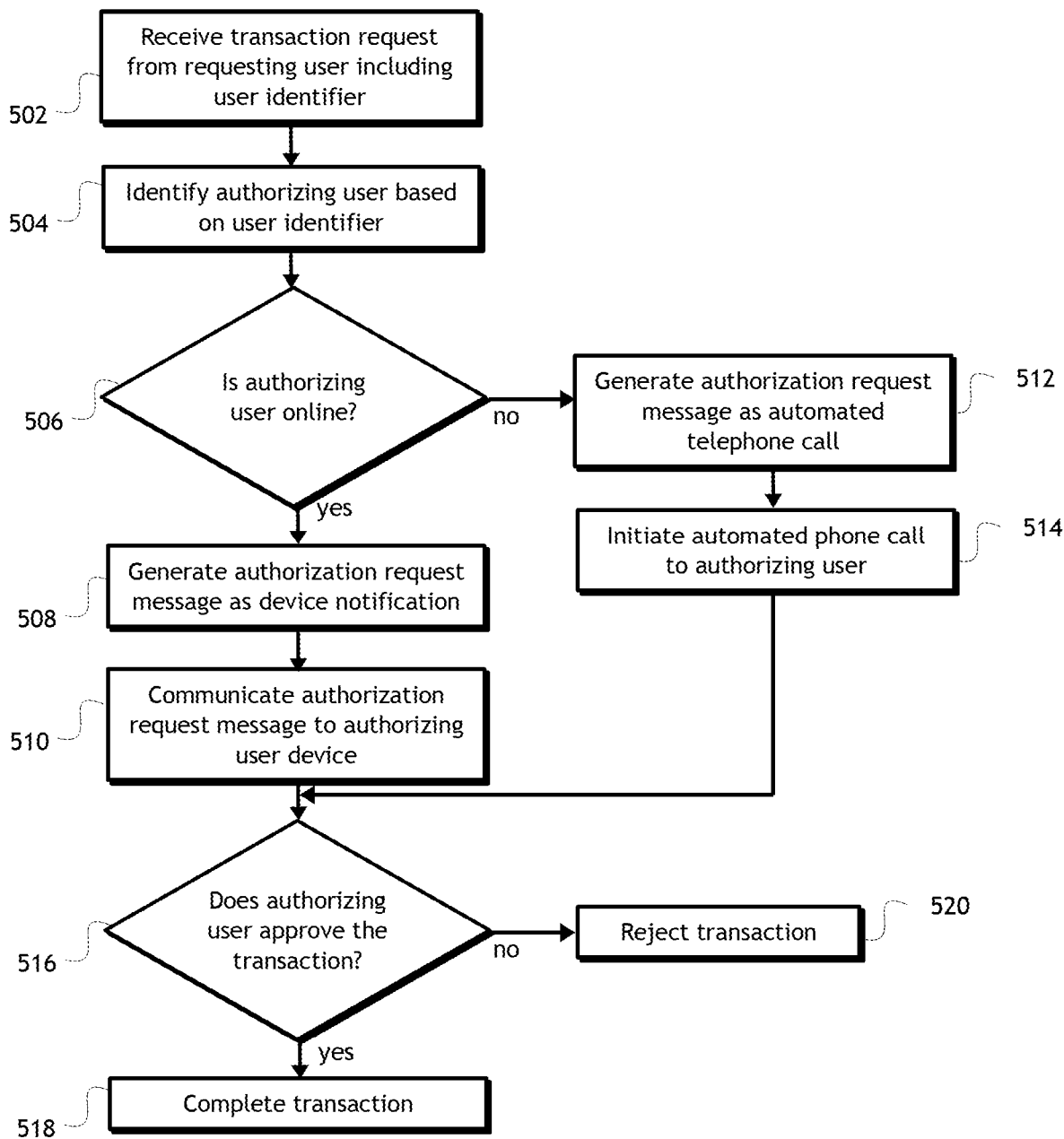
FIG. 5 is a flow diagram of a method for remotely authorizing a transaction according to a non-limiting embodiment.

Referring now to FIG. 5, a flow diagram is shown for a method of remotely authorizing a user according to a non-limiting embodiment. At a first step 502, a transaction request is received from a requesting user including a user identifier. The transaction request may be received by a merchant system, transaction processing server, electronic wallet system, payment gateway, and/or any other computing system. At step 504, an authorizing user is identified based at least partially on the user identifier. For example, a database may be queried based on the user identifier to determine if the user identifier is linked to an authorizing user's account. For example, if the user identifier is a telephone number, an authorization database may be queried to determine what authorizing user registered that telephone number.

With continued reference to FIG. 5, once the authorizing user is identified, at step 506 it is determined whether the authorizing user is online. If the authorizing user is determined to be online, the method proceeds to step 508 and an authorization request message is generated as a device notification. At step 510, the authorization request message is communicated to an authorizing user device associated with the authorizing user. If the authorizing user is determined to be offline at step 506, the method proceeds to step 512 and an authorization request message is generated as an automated telephone call. The authorization request message may be generated, for example, as an IVR script. At step 514, an automated telephone call is initiated to the authorizing user. The automated telephone call may be conducted according to an IVR script.

Still referring to FIG. 5, at step 516, it is determined whether the authorizing user approved of the transaction. Such approval may be received in response to a device notification communicated in step 510 or in response to an automated phone call initiated at step 514. If the transaction is approved, the method proceeds to step 518 and the transaction is completed. If the transaction is not approved, the method proceeds to step 520 and the transaction is rejected.

Figure 6:
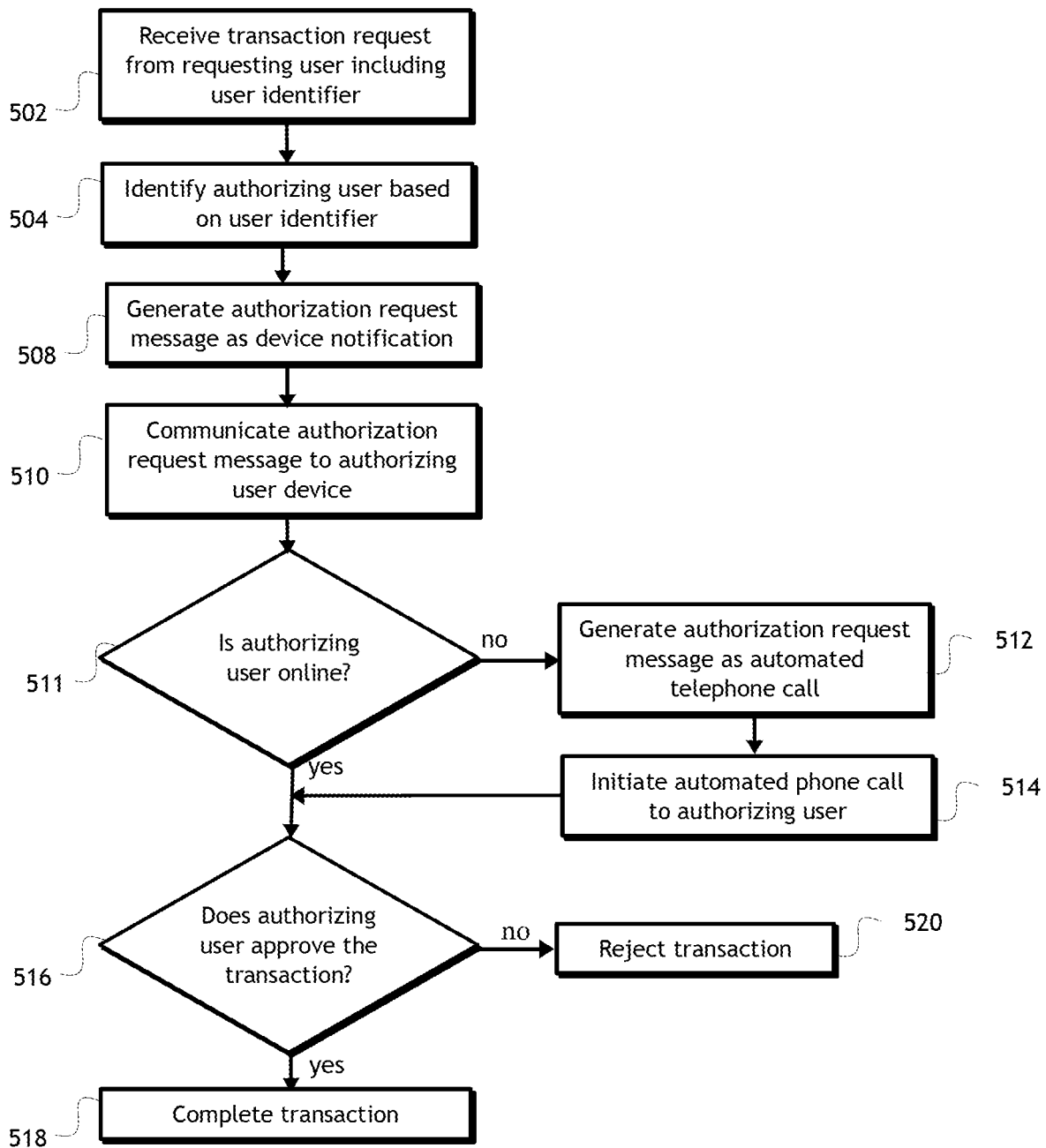
FIG. 6 is a flow diagram of a method for remotely authorizing a transaction according to a non-limiting embodiment.

Referring now to FIG. 6, a flow diagram is shown for a method of remotely authorizing a user according to another non-limiting embodiment. The method shown in FIG. 6 follows several of the steps shown in FIG. 5 and described above. However, in the method shown in FIG. 6, the authorizing user is determined to be online or offline at step 511 after an authorization request message is generated as a device notification at step 508 and communicated to the authorizing user device at step 510, and after a predetermined period of time elapses without receiving an authorization response message or any other type of response from the authorizing user device. Thus, determining whether the user is online or offline at step 511 may include determining if a predetermined time period has elapsed since communicating the authorization request message or determining that a responsive network packet was not received following a ping or transmission of the authorization request message. If no response is received from the authorizing user, the method may proceed to step 512 and continue as described above in connection with FIG. 5.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer program product for authorizing a transaction, comprising at least one non-transitory computer readable medium including program instructions that, when executed by at least one processor, cause the at least one processor to:
   receive, through a graphical user interface, a transaction request comprising at least one user identifier, the transaction request received from a requesting user;
   determine whether the requesting user is approved to conduct the transaction based on at least one approval database and the at least one user identifier;
   in response to determining that the requesting user is approved to conduct the transaction, automatically generate an approval of the transaction request;
   in response to determining that the requesting user is not approved to conduct the transaction, determine an authorizing user of a plurality of authorizing users based at least partially on the at least one user identifier;
   determine whether the authorizing user is online;
   in response to determining that the authorizing user is not online, communicating an authorization request message to a user device associated with the authorizing user, the authorization request message comprising an automated telephone call configured to audibly prompt the authorizing user to provide an approval of the transaction request; and
   complete the transaction in response to receiving an approval of the transaction request from the authorizing user.

2. The computer program product of claim 1, wherein determining whether the authorizing user is online comprises:
   communicating a mobile device message configured to prompt the authorizing user to provide an approval of the transaction request; and
   determining that the authorizing user is not online in response to determining that the approval of the transaction request is not received within a predefined time period.

3. The computer program product of claim 1, wherein the at least one user identifier comprises a telephone number, and wherein the at least one approval database comprises a plurality of telephone numbers associated with the authorizing user.

4. The computer program product of claim 1, wherein the transaction comprises at least one of the following: a payment transaction, granting access to a system, granting access to a facility, or any combination thereof.

5. The computer program product of claim 1, wherein the program instructions, when executed by the at least one processor, further cause the at least one processor to: in response to determining that the authorizing user is not online, communicate a different authorization request message to a user device associated with the authorizing user, the different authorization request message comprising a mobile device message configured to cause the user device associated with the at least one authorizing user to prompt the authorizing user to provide an approval of the transaction request.

6. A system for authorizing a transaction, comprising at least one server computer including at least one processor programmed or configured to:
   receive, through a graphical user interface, a transaction request comprising at least one user identifier, the transaction request received from a requesting user;
   determine whether the requesting user is approved to conduct the transaction based on at least one approval database and the at least one user identifier;
   in response to determining that the requesting user is approved to conduct the transaction, automatically generate an approval of the transaction request;
   in response to determining that the requesting user is not approved to conduct the transaction, determine an authorizing user of a plurality of authorizing users based at least partially on the at least one user identifier;
   determine whether the authorizing user is online;
   in response to determining that the authorizing user is not online, communicating an authorization request message to a user device associated with the authorizing user, the authorization request message comprising an automated telephone call configured to audibly prompt the authorizing user to provide an approval of the transaction request; and
   complete the transaction in response to receiving an approval of the transaction request from the authorizing user.

7. The system of claim 6, wherein determining whether the authorizing user is online comprises:
   communicating a mobile device message configured to prompt the authorizing user to provide an approval of the transaction request; and
   determining that the authorizing user is not online in response to determining that the approval of the transaction request is not received within a predefined time period.

8. The system of claim 6, wherein the at least one user identifier comprises a telephone number, and wherein the at least one approval database comprises a plurality of telephone numbers associated with the authorizing user.

9. The system of claim 6, wherein the transaction comprises at least one of the following: a payment transaction, granting access to a system, granting access to a facility, or any combination thereof.

10. The system of claim 6, wherein the at least one processor is further programmed or configured to: in response to determining that the authorizing user is not online, communicate a different authorization request message to a user device associated with the authorizing user, the different authorization request message comprising a mobile device message configured to cause the user device associated with the at least one authorizing user to prompt the authorizing user to provide an approval of the transaction request.

* * * * *